United States Patent [19]

Clayson et al.

[11] Patent Number: 4,587,881
[45] Date of Patent: May 13, 1986

[54] DEPRESSION GUN POD

[75] Inventors: Arthur E. Clayson, Inyokern; Jack Bates; Richard D. Fulmer, both of Ridgecrest, all of Calif.

[73] Assignee: The United States of America as represented by the Secretary of the Navy, Washington, D.C.

[21] Appl. No.: 659,739

[22] Filed: Oct. 11, 1984

[51] Int. Cl.⁴ ............................................. F41F 23/00
[52] U.S. Cl. ..................................... 89/37.16; 89/41.12
[58] Field of Search ................ 89/37.16, 37.17, 37.19, 89/37.21, 41.01, 41.02, 41.12

[56] References Cited

U.S. PATENT DOCUMENTS

| | | | |
|---|---|---|---|
| 2,335,835 | 11/1943 | Zietlow, Jr. | 89/37.19 X |
| 2,377,091 | 5/1945 | McFarland | 89/37.5 |
| 2,454,806 | 11/1948 | Kemmer et al. | 89/37.5 |
| 2,463,182 | 3/1949 | Ketay | 89/37.5 |
| 2,737,853 | 3/1956 | Granvenhorst et al. | 89/37.5 |
| 2,915,948 | 12/1959 | Fehring | 89/37.16 |
| 3,352,207 | 11/1967 | Proudlove | 89/37.5 |

FOREIGN PATENT DOCUMENTS 578548 7/1946 United Kingdom ............... 89/37.19

OTHER PUBLICATIONS

Flight International—*Military Aircraft of the World*, June 12, 1982, p. 1550.

*Primary Examiner*—David H. Brown
*Assistant Examiner*—John S. Maples
*Attorney, Agent, or Firm*—Robert F. Beers; W. Thorn Skeer; Stephen J. Church

[57] ABSTRACT

A depression gun pod for detachable connection to an aircraft stores suspension rack, the pod having a gun and having a gun mount providing for depression of the gun in elevation and for limited azimuth movement; the mount utilizing a plurality of planar frame-like members which are disposed in a compact configuration within the pod when the gun is in a forward firing position and which rigidly support the gun as it moves in depression and azimuth.

7 Claims, 10 Drawing Figures

DEPRESSION GUN POD

BACKGROUND OF THE INVENTION

1. Field of the Invention

This invention pertains to a pod for detachable connection externally of an aircraft. More particularly, this invention pertains to such a pod serving as a unitary gun system for a relatively high speed attack aircraft and including a gun and a gun mount for positioning the gun continuously in azimuth and continuously in elevation between a forward firing position and a position depressed below such position, so as to provide greater tactical flexibility when attacking with the gun.

2. Description of the Prior Art

It is well known to provide attack or other aircraft with a stores suspension rack for detachably mounting a selected pod of several interchangeable pods of different types for use with different missions. One well known type of pod mounts one or more guns, primarily for ground attack, but also usable for air-to-air combat. Such a gun pod in present fixed wing, as opposed to helicopter, attack aircraft must function effectively at speeds of 150 to 550 knots. In prior art gun pods suited for such aircraft the gun, typically, is fixed in relation to the balance of the pod so that the gun must be aimed by aiming the entire aircraft as shown in FIG. 1A, thus limiting the length of a burst that may be fired by requiring that the aircraft approach the target in a straight line. Such an approach facilitates anti-aircraft fire against the aircraft.

It is, of course, well-known to provide aircraft with a forwardly and downwardly disposed turret which is a permanent portion of the aircraft structure and is adapted for depression fire and for a wide-angle of fire in azimuth. Such turrets are unsuited for use in present or future attack aircraft due to weight and to drag and to power requirements at the relatively high speed of such aircraft. Typical turret structures extending normal to the forward firing gun axis and disposed within the aircraft are, in any event, unfavorably configured for use in the usual elongated aircraft pod, and the relatively wide angles provided by such turrets in elevation and azimuth are not required in high speed attack aircraft tactics. It is also known to provide an aircraft with a gun pod having a gun which can be depressed for strafing.

SUMMARY OF THE INVENTION

Accordingly it is an object of the subject invention to provide an improved depression gun pod having a gun positionable between a forward firing position and a depressed position.

Another object is to provide such a pod adapted for detachable connection to a stores suspension rack of an aircraft and interchangeable with pods for stores of other types.

Another object is to provide such a pod having, when the gun is in the forward firing position, substantially the same drag as a pod providing only a fixed forward firing position and having minimal drag when the gun is in a fully depressed position.

Another object is to provide such a pod having a gun mount which is light in weight and is compactly configured when the gun is in the forward firing position and which is rigid so as to maintain the gun precisely in a selected depressed position despite aerodynamic and recoil forces.

Another object is to provide such a pod having the foregoing advantages and also adapted to position the gun in azimuth.

Another object is to provide such a pod adapted for use with automatic fire control systems.

Another object is to provide such a depression gun pod providing an aircraft equipped therewith with the ability to fire effective bursts of greater length, with the ability to utilize approach paths to a target disadvantageous to anti-aircraft fire therefrom, and with the ability to utilize such a path suited to fire on relatively lightly armored portions of a target.

BRIEF DESCRIPTION OF THE DRAWINGS

Other objects, advantages and novel features of the invention will become apparent from the following detailed description of the invention when considered in conjunction with the accompanying drawing figures, wherein.

DESCRIPTION OF THE PREFERRED EMBODIMENT

Figure 1A:
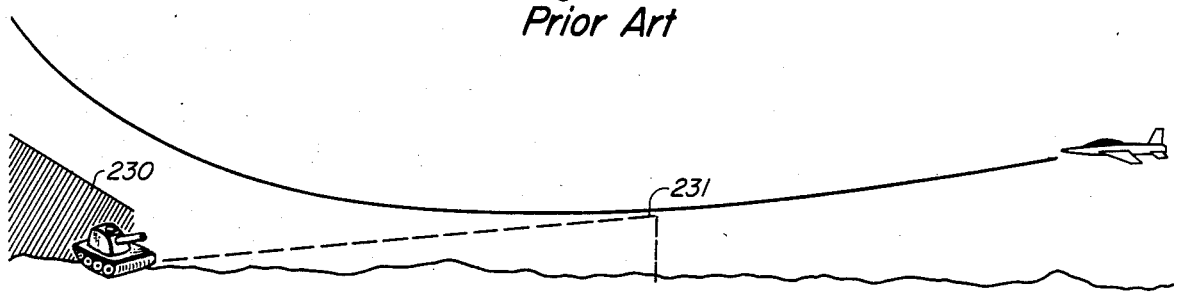
FIG. 1, which is referred to above, depicts the use of aircraft gun pods in a representative operating environment, FIG. 1A showing the use of such a pod with a prior art fixed mount pod and FIG. 1B showing the use of a depression gun pod embodying the principles of the present invention.
Figure 1B:
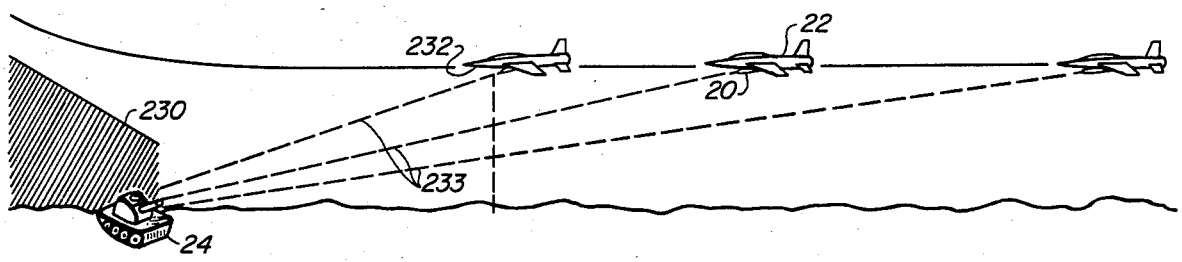

Referring to FIG. 1B, a depression gun pod 20 embodying the principles of the subject invention as shown in a representative operating environment mounted on an aircraft 22 which is shown in successive positions during a strafing attack on a ground target 24 by a gun of pod 20 in a manner to be fully explained below. Aircraft 22 is representative of a relatively high speed fixed wing attack aircraft, typically carrying out such an attack at ground speeds in the order of 150 to 550 knots.

Figure 2:
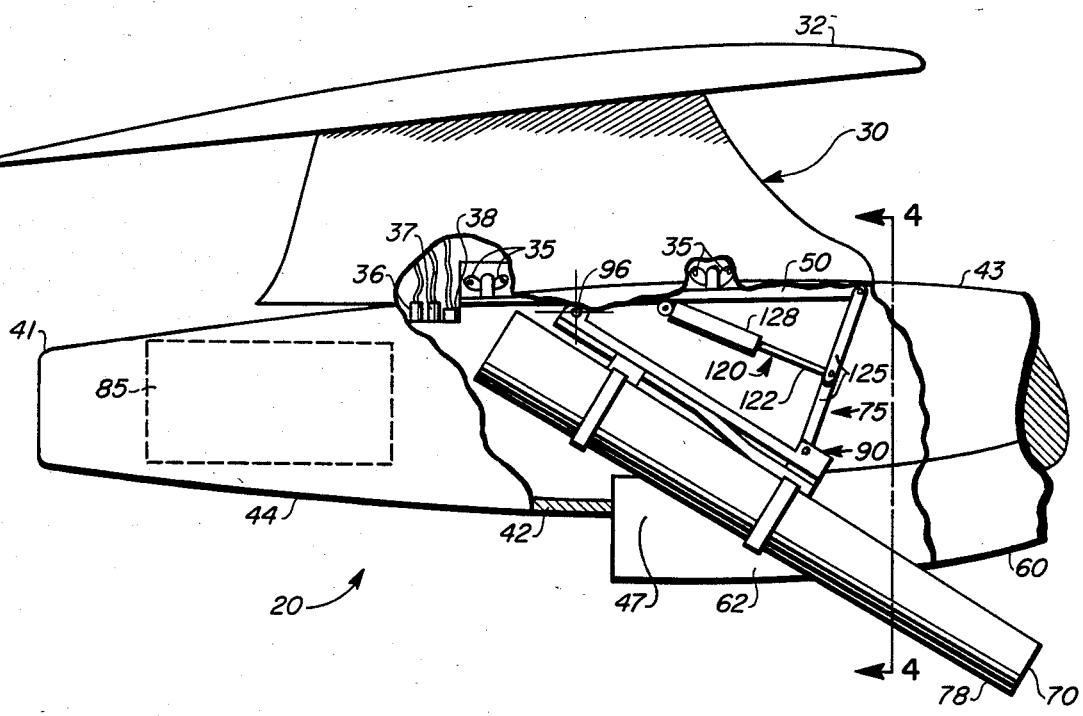
FIG. 2 is a side elevation of a depression gun pod embodying the principles of the subject invention mounted on a fragmentarily represented aircraft, portions of the pod and aircraft being broken away to show the interior and a gun of the pod being disposed in a depressed position.

In FIG. 2 pod 20 is shown mounted in a representative manner on a typical stores suspension rack 30 of aircraft 22. The rack is depicted as mounted on a wing 32 of the aircraft and the rack has two sets 35 of movable hook-like connectors which are adapted to detachably connect pod 20 to aircraft 22 interchangeably with stores of other types depending on the mission for which the aircraft is intended. Rack 30 provides, as shown in FIG. 2 and diagrammatically in FIG. 9, a hydraulic supply connector 36 and a hydraulic return connector 37 which provide the pod with hydraulic power from any suitable hydraulic system of the aircraft. The rack also provides for the pod an electrical connector 38 for purposes subsequently described.

Figure 3:
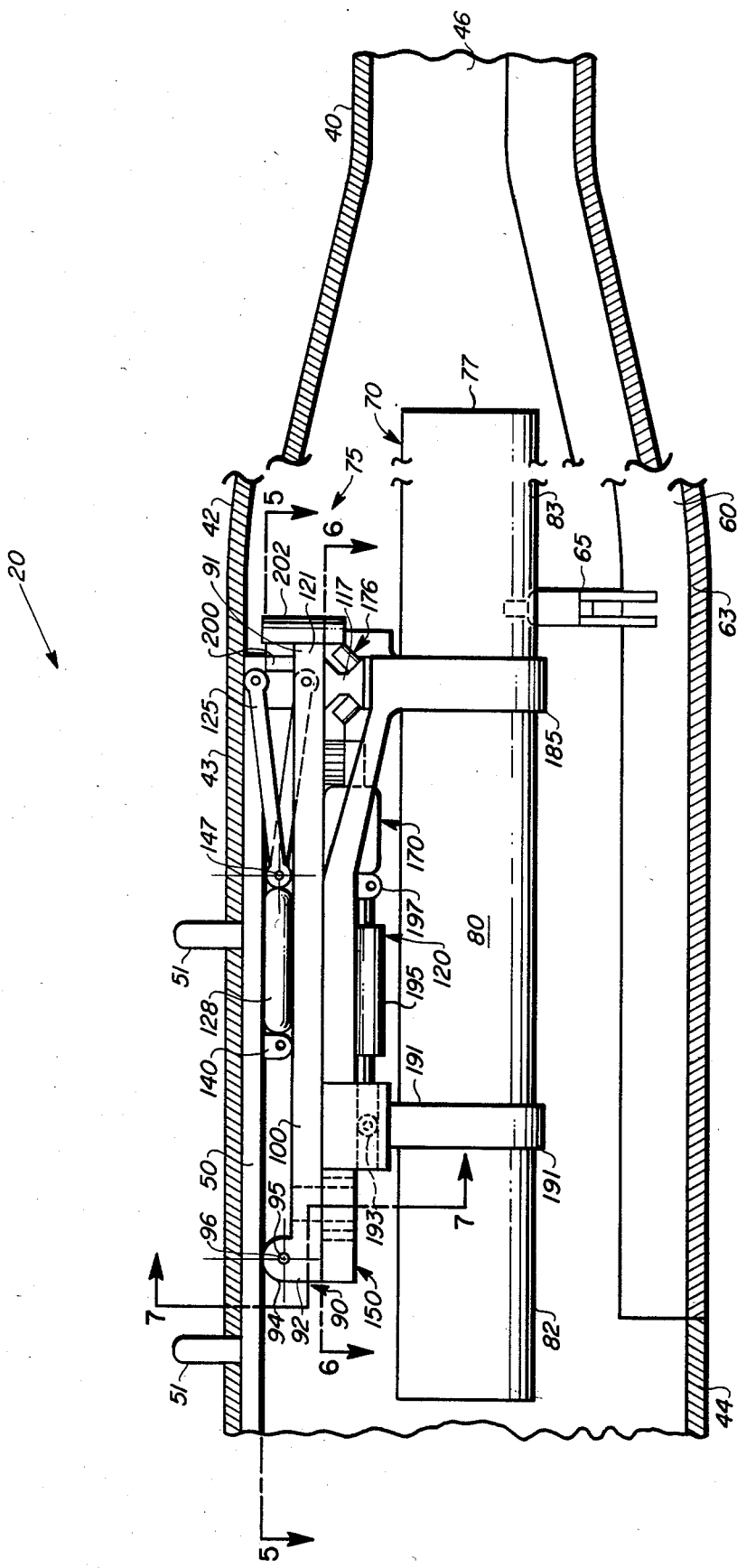
FIG. 3 is a fragmentary elevation of the interior of the pod at a scale enlarged from that of FIG. 2 and with a portion of the pod broken away for illustrative convenience, showing a strong back, a depression gun mount, and a gun disposed in a forward firing position.
Figure 4:
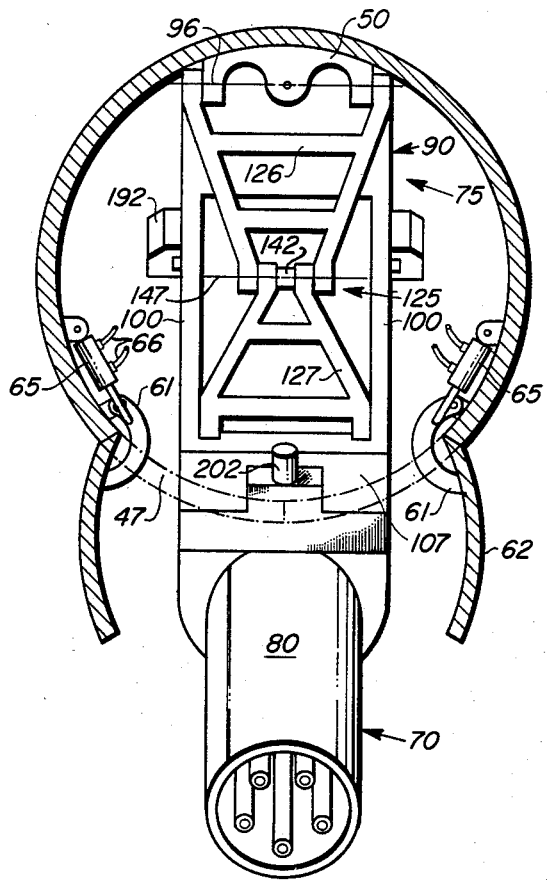
FIG. 4 is a vertical section of the pod taken from the position of line 4—4 of FIG. 2, alternate positions of doors of the mount and of a gun being depicted in dot-dash lines.

Pod 20 is elongated generally in the direction of flight of the aircraft 22 and thus has a forward end 40, shown in FIG. 3, and a rearward end 41. The pod has an exterior skin 42 of generally streamlined configuration and of circular cross section in planes normal to the longitudinal axis of the pod as shown in FIG. 4. Pod 20, typically, is adapted for connection to rack 30 along skin 42 at a predetermined upward side of the pod 43 opposite a downward side 44 thereof. Skin 42 is configured so as to provide a circular first or forward opening, indicated by the numeral 46 in FIG. 3, aligned with the longitudinal axis of the pod. Skin 42 also defines a second or downward opening, best shown in FIGS. 2 and 4, indicated by the numeral 47. The downward opening extends rearwardly from the forward opening along the downward pod side 44 and is of generally rectangular configuration as viewed toward this side.

Figure 7:
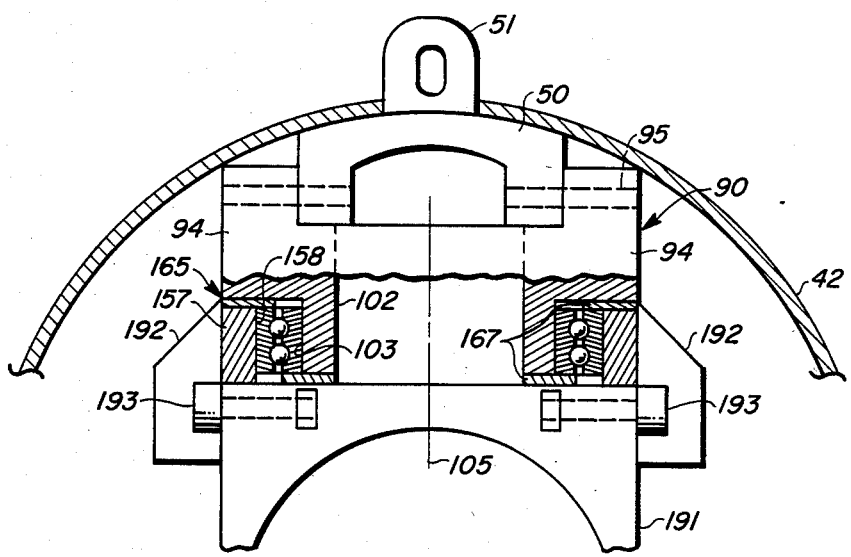
FIG. 7 is a vertical section of the gun mount taken from the position of line 7—7 of FIG. 3 and at a further enlarged scale.
Figure 9:
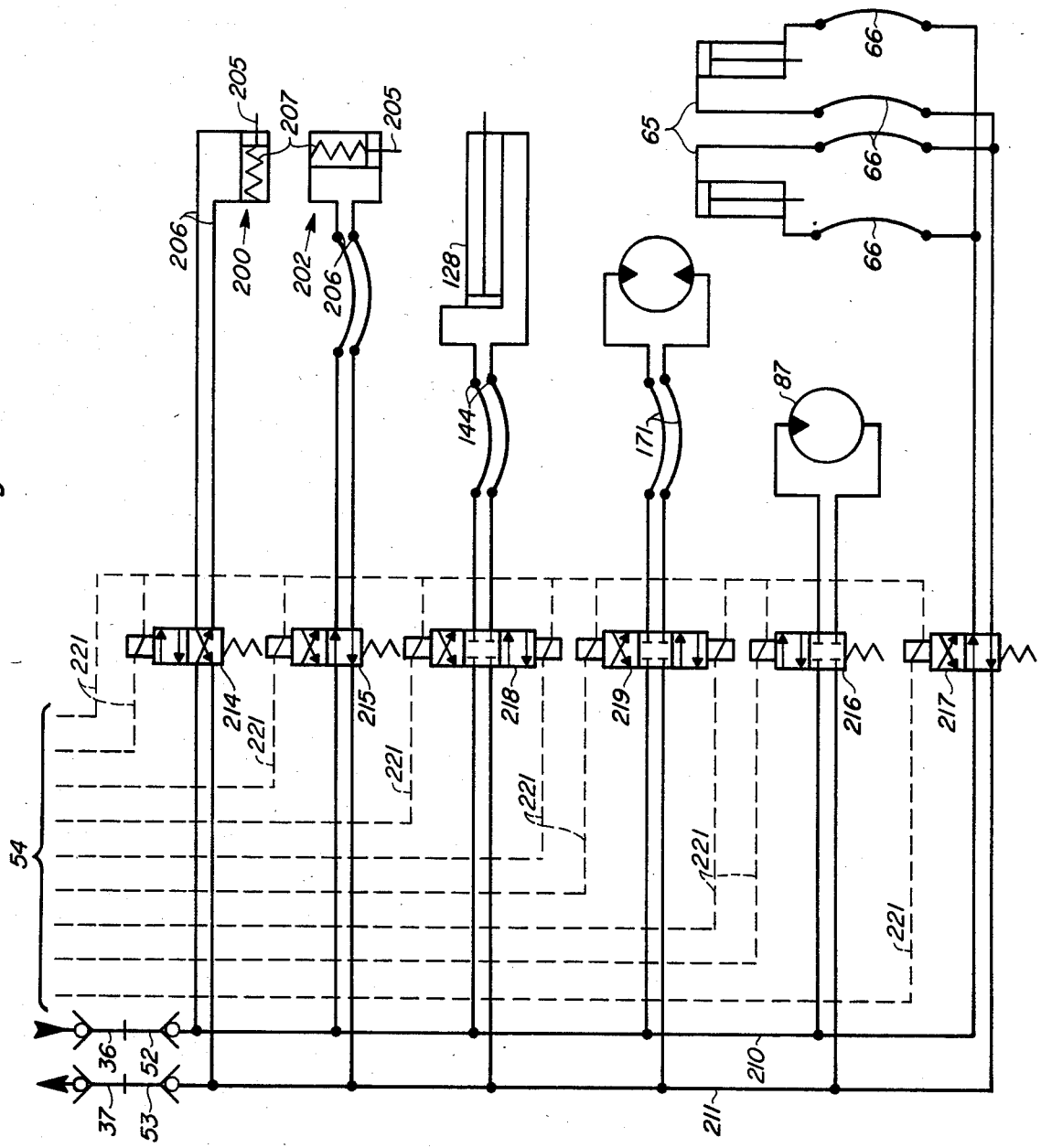
FIG. 9 is a diagram of a representative hydraulic system for use in a depression gun pod embodying the principles of the subject invention.

Pod 20 has a strong back or attachment member 50 which extends, as best shown in FIGS. 2 and 3, longitudinally of the pod along its upward side 43 and is provided with a pair of eye-like connectors 51, best shown in FIGS. 3 and 7, for individual engagement by the rack connectors 35 to detachably connect pod 20 to aircraft 22. Strong back 50 also has quick disconnect hydraulic connectors 52 and 53, as shown in FIG. 9, which connect respectively to rack connectors 36 and 37 and has a quick disconnect electric connector 54 for connection to the rack connector 38.

Pod 20 has a pair of doors 60, extended longitudinally along the pod oppositely of the downward opening 47 and mounted on skin 42 by any suitable hinges 61, as shown in FIGS. 4, for movement of the doors between an open position 62 shown in FIGS. 2 and 4, in which opening 47 is downwardly unobstructed, and a closed position 63, shown in FIG. 3 and in dot-dash lines in FIG. 4, in which the doors close the downward opening. Each door is provided with a hydraulic actuator 65, as shown in FIGS. 3, 4 and 9, having opposite connections 66 for motivating the door between its opened and closed positions.

Pod 20 has a gun 70, best shown in FIGS. 2–4, and has a depression mount 75, subsequently to be described in detail, which mounts gun 70 on strong back 50 for movement between a forward firing position 77 of the gun in which it is disposed, as shown in FIG. 3, to fire along the longitudinal axis of the pod through the forward opening 46, and a fully depressed firing position 78 of the gun in which it is disposed through the downward opening 47 for firing forwardly and downwardly of pod 20 as best shown in FIGS. 2 and 4.

Gun 70 is, typically and as shown in FIG. 4, a five barrel revolving cannon of a type well known for use with attack aircraft 22. A gun of any other suitable type may, of course, be used with pod 20. Gun 70, typically, has a generally cylindrical shroud 80 surrounding the barrels and extending longitudinally thereof. The gun has a breech portion 82 disposed centrally of pod 20 between ends 40 and 41 thereof and centrally between pod sides 43 and 44. The gun has a muzzle portion 83 spaced from its breech portion toward the pod forward end 40. Mount 75 is proportioned and dimensioned so that, when the gun is in its forward firing position 77, the muzzle portion is diposed centrally between the pod sides and is juxtapositioned to the forward pod opening 46 and so that, when the gun is its fully depressed position 78, the muzzle position is disposed downwardly of pod downward side 44 and is extended from and through pod opening 47. The pod has any suitable apparatus, represented by the dash line rectangle 85 in FIG. 2 and disposed within skin 42 between gun breech portion 82 and pod rearward end 41, for storing ammunition for the gun and for conveying the ammunition to breech portion 82. The pod is also provided with any suitable drive and firing apparatus for the gun, this apparatus typically including a hydraulic motor 87, shown in FIG. 9, as a rotational drive for revolving gun 70, the gun firing when it is driven by the motor and not firing when the motor is de-energized. In such a drive the motor, typically, is fixed in position in relation to strong back 58 and drives the gun by a flexible shaft, not shown.

Figure 5:
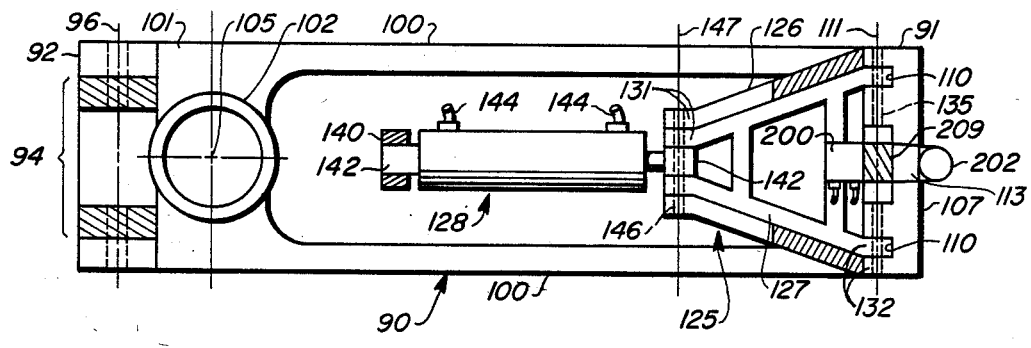
FIG. 5 is a horizontal section of the gun mount of FIG. 3 taken from the position of line 5—5 thereof.

Mount 75 has an elevation cradle 90 shown in FIGS. 2–8. Cradle 90 extends generally along gun 70 between breech portion 82 and muzzle portion 83 thereof. Cradle 90 thus has a first end portion 91 disposed toward forward pod end 40 and has a second end portion 92 disposed toward rearward pod end 41. As best shown in FIGS. 3, 5 and 7, cradle 90 has a pair of lugs 94 extended upwardly from its end portion 92 transversely oppositely of a pair of corresponding lugs of strong back 50. The transversely adjacent pairs of lugs are connected by individual elevation bearings 95 of any suitable construction providing for pivotal movement of cradle 90 relative to the strong back 50 about a depression or elevation axis 96 shown in FIGS. 3 and 4 and extended transversely of pod 20 through lugs 94. This axis is disposed adjacent to breech portion 82 and to cradle end portion 92. It is evident that bearings 95 interconnect the cradle end portion 92 and strong back 50 for movement about axis 96.

Elevation cradle 90 is of generally planar and rectangular frame-like configuration extending parallel to the longitudinal axis of pod 20 and to elevation axis 96 and having a pair of longitudinal side members 100 extended individually forwardly from lugs 94. This cradle has a rearward cross member 101 connecting the side members immediately forwardly of these lugs. Cradle 90 has a ring 102, shown in FIGS. 3 and 5–7, extending downwardly from cross member 100 and providing a cylindrical outer surface 103. This surface defines an azimuth axis 105 which extends substantially normal to the longitudinal axis of pod 20 and to elevation axis 96 and which is disposed adjacent to breech portion 82. Elevation cradle 90 has, at its forward end portion 91, a forward cross member 107 connecting side members 100 and best shown in FIGS. 4, 5 and 8. Cradle 90 bears a rack 108 which is arcuate about azimuth axis 105 and is provided with gear teeth on the side disposed toward this axis. The rack extends between side members 100 and is spaced somewhat from cross member 107 toward the azimuth axis.

Figure 8:
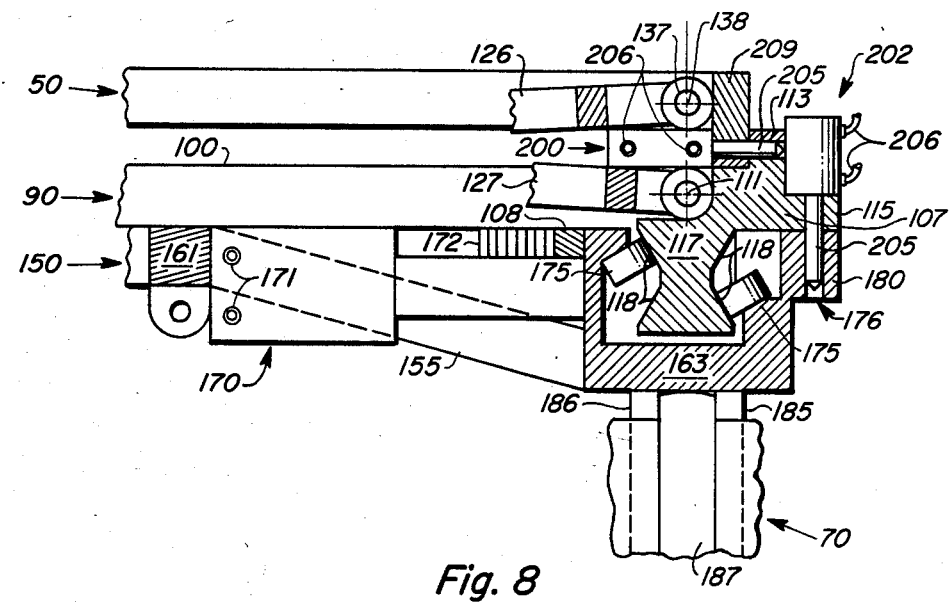
FIG. 8 is a section on line 8—8 of FIG. 6 at a scale enlarged therefrom showing a support bearing and an azimuth drive unit used with the gun mount.

Cross member 107 is provided with a pair of recesses 110, best shown in FIG. 5, on its upward side individually adjacent to side members 100. The cross member has a pair of bores individually opposite each recess, the bores being aligned along an axis 111, sometimes referred to in the claims as a "second axis", parallel to elevation axis 96. It is apparent that axis 96 is disposed forwardly of cradle end portion 92. Cross member 107 is provided with an elevation lock lug 113, best shown in FIGS. 5 and 8, extended upwardly from it somewhat forwardly of recesses 110 and centered between side members 100. A bore extends through this lug parallel to the longitudinal axis of pod 20. Cross member 107 is provided with an azimuth lock lug 115 extended from it forwardly of lug 113 and provided with a bore parallel to azimuth axis 105. Cross member 107 has an arcuate roller track 117, shown in FIGS. 3, 6 and 8, disposed beneath the cross member and extended between side members 100. Track 117 is curved about azimuth axis 105 and in cross section, as best seen in FIG. 8, is of hourglass-like configuration so as to provide four surfaces 118 which are portions of cones centered on the azimuth axis.

Pod 20 has an elevation positioner or actuator indicated generally by the numeral 120 in FIG. 2 and 3, subsequently identified portions of the positioner being shown in FIG. 4, 5, and 9. Positioner 120 interconnects strong back 50 and elevation cradle end portions 91 adjacently to gun muzzle portion 83 so as to support this portion from the strong back and to motivate this portion to pivot about axis 96 in relation to the strong back, and, as will subsequently become apparent, carry gun 70 between its positions 77 and 78. Positioner 120 thus serves to position elevation cradle 90 in and between a first position 121, shown in FIG. 3 and corresponding to gun position 77, and a second position 122, shown in FIG. 2 and corresponding to gun position 78.

Positioner 120 includes a linked framework or pantograph 125, which has an upper frame 126 and a lower frame 127 and a hydraulic cylinder assembly or actuator 128. These elements and their connections to each other and to strong back 50 and to cradle 90 will now be described in detail with reference to FIGS. 3, 4 and 5. Frames 126 and 127 are generally planar and trapezoidal and have individual narrow first ends 131, which are juxtapositioned to each other and are connected to cylinder assembly 128, and opposite individual wider second ends 132. This second end of upper frame 126 is pivotally connected to strongback 50, and the second end of lower framed 127 pivotally connected to cradle 90.

As best shown in FIG. 5, second end 132 of lower frame 127 has a pair of projections which are individually received in recesses 110 and are individually interconnected to elevation cradle 90 by pivots 135 for pivotal movement of this frame relative to the cradle about axis 111. It is apparent that axis 111 is adjacent to such second end, that such second end is pivotally connected to first end portion 91 of cradle 90, and that first end 131 of this cradle is spaced rearwardly from end 132 thereof. Second end 132 of upper frame 126 has opposite projections which are disposed transversely outwardly of strong back 50 and are individually interconnected thereto by a pair of pivots 137 which define an axis 138, sometimes referred to in the claims as "third axis", which is parallel to elevation axis 96 and extends through end 132 of frame 126, and is disposed above end 132 of frame 127. Upper frame 126 is thus pivotally connected to strong back 50 for movement relative thereto about axis 138. Strong back 50 is provided with a pair of lugs 140 extended downwardly from it and spaced substantially rearward of axis 138.

Assembly 128 is of well known construction, being elongated and having a pair of opposite ends 142. One of these ends is disposed between lugs 140 and is pivotally connected thereto, and thus to strong back 50, for movement about an axis extended parallel to elevation axis 96. The assembly extends forwardly from lugs 140 so that the other of its ends 142 is juxtapositioned to the juxtapositioned first ends 131 of frames 126 and 127. Assembly 128 has a pair of hydraulic connectors 144, shown in FIGS. 5 and 9, and is selectively expansible and contractable in a direction between its ends by suitable application of hydraulic pressure to connectors 144. Ends 131 of frames 126 and 127 are each of bifurcated configuration, as best seen in FIGS. 4 and 5, with such end of frame 127 being received within such end of frame 126 and with assembly end 142 being received within such end of frame 127. A pivot pin 146 extends through such frame ends and assembly end, interconnecting them for relative pivotal movement about an axis 147, sometimes referred to in the claims as "first axis" extended through such ends and parallel to elevation axis 96. It is evident that axis 147 is adjacent to first frame ends 131 and that pivot pin 146 interconnects frames 126 and 127 for relative pivotal movement about this axis. These frames and assembly 128 are proportioned and dimensioned so that contraction and expansion of the assembly moves the first frame ends in a path generally along the longitudinal axis of pod 20 such that contraction of assembly 128 draws frame ends 131 rearwardly of pod 20 urging the frames 126 and 127 together at their ends 132 thereby pivoting cradle 90 about axis 96 toward its position 77, and such that expansion of assembly 128 moves frame ends 131 forwardly urging the frames apart at their ends 132 and pivoting cradle 90 toward position 122 and thus motivating gun 70 towards its position 78.

Pod 20 has an azimuth cradle 150, best shown in FIG. 3 and 6–8. Cradle 150 is disposed between elevation cradle 90 and gun 70 and extends adjacent to and along the gun between its breech portion 82 and muzzle portion 83. Cradle 150 thus has a first end portion 151 adjacent to the muzzle portion and a second end portion 152 adjacent to the breech portion. Cradle 150 is a generally rectangular and planar frame disposed in parallel relation to elevation cradle 90 and thus disposed generally parallel to the longitundinal axis of pod 20 and to depression axis 96. It is apparent from FIG. 3 that azimuth cradle 50 is disposed between gun 70 and strong back 50 and that elevation cradle 90 is disposed between the azimuth cradle and the strong back.

Azimuth cradle 150 has a pair of side members 155, a rearward cross member 157 provided with a bore 158 coaxially related to and circumscribing ring 102 of elevation cradle 90, a central cross member 161, and a forward cross member 163. Member 163 is of upwardly open U-shaped configuration, as best shown in FIG. 8, so as to receive roller track 107. Pod 20 has an azimuth bearing 165, best shown in FIGS. 6 and 7, of any suitable construction disposed between bore 158 and surface 103 of ring 102. Bearing 165 is depicted as a double row ball bearing circumscribing azimuth axis 105 and retained to cradles 90 and 150 by plates 167. It is apparent that bearing 165 connects cradles 90 and 150 at their respective second end portions 92 and 152 for pivotal movement of cradle 150 relative to cradle 90 about axis 105, and it is apparent that axis 105 extends through these end portions in generally normal relation to the planes of cradles 90 and 150. Side members 155 are closely adjacent and parallel to elevation cradle 90 between cross members 157 and 161 and extend downwardly from the latter cross member to cross member 163 so that the side member does not engage rack 108 or track 107 as azimuth cradle 150 pivots about axis 105 between opposite extreme positions 169 indicated by dot-dash lines in FIG. 6.

Figure 6:
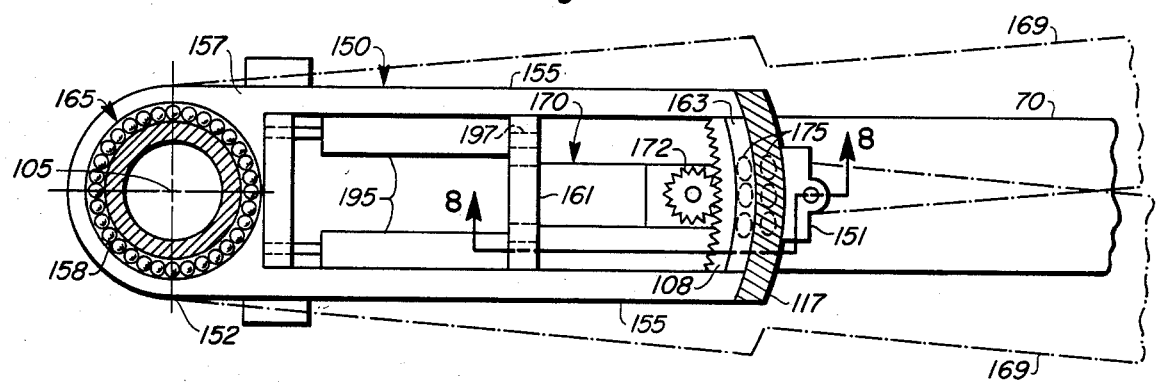
FIG. 6 is a horizontal section of the gun mount taken from the position of line 6—6 of FIG. 3, alternate positions of certain elements being shown in dot-dash lines.

Pod 20 has an azimuth actuator 170 of any suitable construction, best shown in FIGS. 3, 6, 8 and 9, for motivating azimuth cradle 150 about axis 105 relative to elevation cradle 90. This actuator is depicted as a well-known reversible rotary hydraulic drive unit mounted on the azimuth cradle and extending between the cross members 161 and 163 centrally of side members 155. Actuator 170 has a pair of hydraulic connectors 171 and has a pinion 172 which engages with rack 108 as best shown in FIGS. 6 and 8.

Cross member 163 is provided with cylindrical rollers 175 pivotally mounted on it and engaged peripherally with track 117. It is evident that rollers 175, track 117, and cross member 163 define a support bearing, indicated generally by the numeral 176, interconnecting cradle first end portions 91 and 121 adjacently to muzzle portion 83. Bearing 176 supports end portion 121 and, as will subsequently be apparent, gun 70 from end portion 91 as azimuth cradle 150 pivots about axis 105 and moves transversely of pod 20 at muzzle portion 83. Typically, a transversely central pair of the rollers 175 are disposed oppositely of the upper pair of the surfaces 118 in individual engagement therewith to resist upward forces on azimuth cradle 150, and two transversely outer pairs of the rollers are similarly disposed in relation to the lower pair of such surfaces to support the weight of gun 70 and cradle 150 and to resist downward forces thereon.

As best shown in FIGS. 6 and 8, cross member 163 is provided with a lug 180 extended forwardly from it and disposed so as to be aligned with azimuth lock lug 115 when azimuth cradle 150 is centered transversely of cradle 90 in its movement about axis 105. Lug 180 is provided with a bore which is aligned with the bore of lug 115 when these lugs are so aligned.

Gun 70 is directly connected to azimuth cradle 150 for movement therewith in any suitable manner. Typical and well known elements for this purpose, are best shown in FIGS. 3, 4, 7 and 8 and include a ring 185 extending downwardly from cross member 163 in circumscribing relation to gun shroud 80. This ring has, as shown in FIG. 8, an inner cylindrical surface 186 axially slidably engaged peripherally with a rotational bearing 187 of gun 70, thereby supporting the gun centrally for rotation of the shroud and for axial recoil movement. As best shown in FIGS. 3 and 7, gun 70 has at its breech portion 182 a non-rotating flange 191 disposed between transversely spaced recoil tracks 192 affixed individually to side members 155, each track having a groove receiving a roller 193 mounted on flange 191 so as to support breech portion 182 in recoil movement the gun 70. A pair of elongated cylindrical recoil adapters 195, best shown in FIGS. 3, 6 and 7, extend individually forwardly from rollers 193 and are anchored oppositely of the rollers to azimuth cradle 150 by clevis-like lugs 197 affixed thereto at each intersection of cross member 161 with side members 155.

As seen in FIGS. 2 and 4, mount 75 is dimensioned and proportioned so that elevation axis 96 extends generally parallel to the plane of elevation cradle 90 and to the plane of azimuth cradle 150 and so that, when gun 70 is in its forward firing position 77, these cradles and frames 126 and 127 of pantograph 125 are generally parallel and disposed in a compact configuration in a direction between sides 43 and 44 of pod 20. It is apparent that, since gun 70 is directly connected to azimuth cradle 150 and since the azimuth cradle is connected to elevation cradle 90 by bearings 165 and 176, the azimuth cradle and the gun pivot together about elevation axis 96 with elevation cradle 90 so that gun 70 pivots about axis 96 between its forward firing position 77 and its fully depressed position 78. It is also apparent that, when elevation cradle 90 is in its first position 121, muzzle portion 83 of gun 70 is aligned longitudinally of pod 20 with breech portion 82 and that, when the elevation cradle is in its second position 122, the muzzle portion is spaced substantially from its location in first position 121 in a direction away from strong back 50.

Pod 20 has, as best shown in FIGS. 3, 4, 5, 8 and 9, an elevation lock 200 and an azimuth lock 202. Locks 200 and 202 each have a locking pin 205 which is extended or retracted by suitable application of hydraulic pressure to connections 206, the pin normally being extended, as by springs 207 depicted in FIG. 9. Azimuth lock 202 is mounted on lug 115 with its pin 205 extending through the bore in such lug so that extension of the pin, when azimuth cradle 150 is centered by actuator 170, engages the pin in the bore of lug 163 of the azimuth cradle and locks the azimuth cradle and gun 70 in a central position in their pivotal movement about axis 105, retraction of such pin releasing this cradle and the gun for movement in azimuth. Elevation lock 200 is mounted on strong back 50 by a lug 209 thereof having a bore aligned with the bore of elevation lock lug 113 of elevation cradle 90 when this cradle is its first position 121 in which gun 70 is in its forward firing position 77. It is apparent that extension of the pin 205 of elevation lock 200 when the elevation cradle is in position 121 locks gun 70 in its forward firing position 77 and that retraction of this pin releases the elevation cradle for movement of the gun from its forward firing position 77.

Pod 20 has a hydraulic system, which is diagrammatically depicted in FIG. 9, for powering and controlling actuator 65, motor 87, assembly 128, actuator 170 and locks 200 and 202 using hydraulic fluid supplied by connector 36 and returned through connector 37 in accordance with electrical signals provided through connector 38. The depicted system is merely representative of systems that might be used to position gun 70 about axes 96 and 105, since those skilled in the art of automatic fire control might find other arrangements advantageous and might find it desrable to also include feedback elements such as position and angular rate of change sensors. The hydraulic system has a supply manifold 210 connected to connector 36 and a return manifold 211 connected to connector 37. These manifolds are connected by suitable conduits to two-position control valves 214, 215, 216 and 217, and to three-position servo control valves 218 and 219. These valves are, in turn, connected hydraulically by other suitable conduits, which may include flexible portions, respectively to elevation lock 200, azimuth lock 202, gun motor 87, door actuators 165, elevation cylinder assembly 128, and azimuth actuator 170. The valves are connected electrically by conductors 221, which are represented by dash lines, to connector 38. Valves 214 through 217 are of any suitable construction such that de-energization of the valves results, respectively, in extension of locking pins 205 of locks 200 and 202, and de-energization of gun motor 87, and closure of door 60 by actuator 65. Conversely, energization of the valves 214 through 217 results, respectively, in unlocking of cradles 90 and 150 for movement about axes 96 and 105, energization of motor 87 to fire gun 70, and opening of door 60. Servo valves 218 and 219 are of any suitable construction such that de-energization thereof, respectively, retains cradles 90 and 150 and elements moving with the cradles in their existing positions. Servo valve 218 is selectively energizable to cause gun 70 to move in a desired direction between its position 77 and 78, and servo valve 219 is selectively energizable to cause gun 70 to move in a desired direction about azimuth axis 105.

OPERATION

The operation of depression gun pod 20 embodying the principles of the subject invention is depicted in FIG. 1B for convenient comparison with a prior art gun pod as shown in FIG. 1A. An aircraft 22 attacking a target 24 must avoid ricochets in the area 230 indicated by shading. When attacking with the prior art gun pod, in which the gun is fixed in relation to the aircraft, the aircraft necessarily is aimed substantially at the target, as shown in FIG. 1A, and must break off the attack at a point 231 substantially spaced from the target.

However with the subject invention, as shown in FIG. 1B, firing may continue until the aircraft 22 is at a point 232 closer to target 24 thereby substantially increasing the number or likelihood of hits on the target. With a prior art gun pod, as shown in FIG. 1A, it is apparent that the aircraft approaches the target along a course at a constant angle along which anti-aircraft fire is easily directed from the target toward the aircraft. However, with the subject invention, the angle of approach to the target constantly changes as indicated by dash lines 233 in FIG. 1A, thereby making such anti-aircraft fire substantially less effective. It is also apparent in comparing FIGS. 1A and 1B that, with the subject invention, the angle of fire is more nearly vertical onto target 24 increasing the likelihood of hits on horizontal surfaces thereof. As a result the likelihood of penetrating armor of the target is increased since such armor, typically, is lighter on horizontal surfaces than on more upright surfaces.

It is apparent that the movement of gun 70 about axes 96 and 105 as provided by the present invention adapts pod 20 for use with automatic fire control systems in which aircraft 24 flies along a fixed course while gun 70 is directed toward the target by actuators 128 and 170.

With pod 20, gun 70 need only be extended and door 60 opened during the moments of an attack which, although at relatively high speed for ground attack, is at relatively low speed compared to maximum speed of aircraft 22. As a result, pod 20 has no more drag during operation of the aircraft than a prior art gun pod, except when gun 70 is moved from its forward firing position 77. This result is due to the above noted compact configuration of mount 75 when gun 70 is in its position 77 in which the mount and the gun are wholly within the pod and doors 60 are closed. Even when gun 70 is depressed from FIG. 77 the pod has minimal drag since, as can be seen in FIG. 2, mount 75 is substantially within skin 42 even when gun 70 is in its fully depressed position 78. The truss-like structure of the elements of the mount when the gun is fully depressed and the frame-like configuration of cradles 90 and 150 together with the large diameter of azimuth bearing 165 and the support provided by bearing 176 result in the gun being rigidly supported at all positions about axes 96 and 105, so that the gun is precisely supported in a position selected by actuators 128 and 170, as in response to an automatic fire control system.

Since pod 20 is detachably connected to aircraft 22 by stores suspension rack 30 usable with pods or stores or other types and since mount 75 and gun 70 are wholly contained within skin 42 when the gun is in position 77, the aircraft does not have to be specifically configured for use with a gun moveable in azimuth and elevation. Performance of the aircraft is not significantly affected when the aircraft is used on missions not requiring a pod embodying the principles of the subject invention.

Obviously many modifications and variations of the present invention are possible in light of the above teachings. It is therefore to be understood that within the scope of the following claims the invention may be practiced otherwise than as specifically described.

What is claimed is:

1. A depression gun mount for use in a gun pod having a predetermined longitudinal axis, having an attachment member, which extends along one side of the exterior of the pod and is detachably connectable to an aircraft, and having a gun, which has a breech portion disposed within the pod and a muzzle portion spaced along the pod from the breech portion, the mount comprising:
   an azimuth member extending generally along the gun between said portions thereof;
   an elevation member extending generally along the gun between said portions thereof;
   means for connecting the gun directly to one of said members;
   means connecting the elevation member to one of the other of the members for pivotal movement of the elevation member relative thereto about a depression axis extended transversely of the pod and disposed adjacent to the breech portion;
   means interconnecting the elevation member and said one of the other of the members adjacently to the muzzle portion for positioning the elevation member between a first position, in which the muzzle portion is aligned in a direction along the pod with the breech portion, and a second position in which the muzzle portion is spaced substantially from the location thereof in the first position in a direction away from the attachment member;
   means connecting the azimuth member to another of said members for pivotal movement of the azimuth member relative thereto about an azimuth axis extended substantially normal to the longitudinal axis and to the depression axis and disposed adjacent to the breech portion; and
   means interconnecting the azimuth member and said another of the members adjacently to the muzzle portion for supporting the azimuth member from said another of the members for movement of the azimuth portion transversely of the pod at the muzzle portion.

2. The depression gun mount of claim 1 wherein said means for positioning the elevation member comprises:

a pantograph which has a pair of frames having individual first ends, which are interconnected for relative pivotal movement of the frames about a first axis extended parallel to the elevation axis and disposed adjacent to the first ends, and having individual second ends, one of the second ends being interconnected to the elevation member for pivotal movement therebetween about a second axis, which extends parallel to the elevation axis and is disposed adjacent to said one of the second ends, and the other of the second ends being interconnected to said one of the other of the members for pivotal movement about a third axis which is parallel to the elevation axis and is disposed adjacent to said other of the second ends; and actuator means for moving said first ends generally along the longitudinal axis, thereby pivoting the elevation member about the elevation axis between the first position and the second position.

3. The depression gun mount of claim 1 wherein the elevation member and the azimuth member are each a generally planar frame extending parallel to the longitudinal axis and to the depression axis.

4. The depression gun mount of claim 3 wherein the azimuth member is disposed adjacent to the gun between the gun and said attachment member and is said one mount member to which the gun is directly connected and wherein the elevation member is disposed between the azimuth member and said attachment member.

5. A depression gun pod for use with an aircraft stores suspension rack, the pod having a predetermined forward end, a predetermined rearward end, a predetermined upward side, and a predetermined downward side and comprising:

an attachment member extending along the upward side in a direction between said ends and having means for releaseably attaching the pod to the rack;

an external skin defining a first opening at said forward end and defining a second opening extended from the first opening along the downward side toward the rearward end;

a door which extends along the second opening and is mounted on the skin for movement between a position in which the door closes said opening and a position in which the opening is downwardly unobstructed;

means for motivating the door between said positions;

a gun having a breech portion disposed centrally of the pod between said ends and said sides and having a muzzle portion spaced from the breech portion toward said forward end, and the gun having a predetermined forward firing position, in which the muzzle portion is disposed centrally between said sides so that the gun is positioned to fire through the first opening, and having a predetermined fully depressed firing position in which the muzzle portion is disposed downwardly of the downward side and is extended from the second opening so that the gun is positioned for firing forwardly and downwardly;

means disposed within the skin between the breech portion and the rearward end for storing ammunition and for conveying ammunition to the breech portion;

an azimuth cradle of generally planar and frame-like configuration extended along the gun and adjacent thereto between the breech portion and the muzzle portion, the azimuth cradle having a first end portion adjacent to the muzzle portion and a second end portion disposed adjacent to the breech portion;

means connecting the gun to the azimuth cradle for movement therewith;

an elevation cradle of generally planar and frame-like construction disposed between said attachment member and the azimuth cradle, the elevation cradle being disposed in parallel relation to the azimuth cradle and having a first end portion disposed toward the forward end of the pod and a second end portion disposed toward the rearward end of the pod;

azimuth bearing means interconnecting said second end portions for pivotal movement of the azimuth cradle relative to the elevation cradle about an azimuth axis extended through said portions and generally normal to the planes of the cradle;

support bearing means interconnecting said first end portions for supporting the first end of the azimuth cradle and the gun from the first end portion of the elevation cradle as the azimuth cradle pivots about the azimuth axis;

elevation bearing means interconnecting the second end portions of the elevation cradle and the attachment member for pivotal movement of the elevation cradle, together with the azimuth cradle and the gun, about an elevation axis adjacent to said second end portion and extended generally parallel to the planes of the cradles so that the gun pivots about the elevation axis between the forward firing position and the fully depressed position;

azimuth actuator means for motivating the azimuth cradle to pivot about the azimuth axis relative to the elevation cradle; and elevation actuator means interconnecting the first end portion of the elevation cradle and the attachment member for supporting said first end portion therefrom and for motivating said end portion to pivot about the elevation axis in relation to the attachment member and carry the gun between said positions thereof.

6. The pod of claim 5 wherein the elevation actuator means comprises:

a generally planar lower frame having one end, which is pivotally connected to the first end portion of the elevation cradle for movement of said lower frame relative thereto about an axis disposed forwardly of said end portion and at said one end and extended parallel to the elevation axis, and having an opposite end spaced rearwardly from said one end;

a generally planar upper frame having one end, which is pivotally connected to the attachment member at a location above said one end of the lower frame for pivotal movement of the upper frame relative to the attachment member about an axis extending parallel to the elevation axis through said one end of the upper frame, and having an opposite end juxtapositioned to said opposite end of the lower frame;

an elongated, expansible and contractable actuator, one end of said actuator being juxtapositioned to said juxtapositioned opposite ends of the lower frame and of the upper frame and the other end of said actuator being connected to the attachment member for pivotal movement relative thereto about an axis extended parallel to the elevation axis and spaced from said one actuator end toward the rearward end of the pod; and means connecting said juxtapositioned ends of the lower frame, the upper frame, and said actuator for relative pivotal movement therebetween about an axis extending through said ends and parallel to the elevation axis so that contraction of said actuator means urges the upper frame and the lower frame together at their opposite ends to motivate the gun toward the forward firing position and so that expansion of said actuator urges said frames apart at said ends to motivate the gun toward the fully depressed position.

7. The pod of claim 6 wherein, when the gun is in the forward firing position, the azimuth cradle, the elevation cradle, and the lower frame and the upper frame of the elevation actuator means are generally parallel so as to be disposed in a compact configuration in a direction between the upward side and the downward side of the pod.

* * * * *